(12) United States Patent
Nishikawa (10) Patent No.: US 9,914,438 B2
(45) Date of Patent: Mar. 13, 2018

(54) VEHICLE BRAKING FORCE CONTROLLER

(71) Applicant: NTN CORPORATION, Osaka (JP)

(72) Inventor: Akiyoshi Nishikawa, Iwata (JP)

(73) Assignee: NTN CORPORATION, Osaka (JP)

( * ) Notice: Subject to any disclaimer, the term of this patent is extended or adjusted under 35 U.S.C. 154(b) by 47 days.

(21) Appl. No.: 15/076,057

(22) Filed: Mar. 21, 2016

(65) Prior Publication Data

US 2016/0200295 A1 Jul. 14, 2016

Related U.S. Application Data

(63) Continuation of application No. PCT/JP2014/074205, filed on Sep. 12, 2014.

(30) Foreign Application Priority Data

Sep. 24, 2013 (JP) ................................. 2013-196449

(51) Int. Cl.
| | |
|---|---|
| *B60T 7/04* | (2006.01) |
| *B60T 8/171* | (2006.01) |
| *B60T 8/172* | (2006.01) |
| *B60T 1/10* | (2006.01) |
| *B60T 13/66* | (2006.01) |

(52) U.S. Cl.
CPC ................ *B60T 7/042* (2013.01); *B60T 1/10* (2013.01); *B60T 8/171* (2013.01); *B60T 8/172* (2013.01);
(Continued)

(58) Field of Classification Search
None
See application file for complete search history.

(56) References Cited

U.S. PATENT DOCUMENTS

| | | |
|---|---|---|
| 5,419,621 A | 5/1995 | Horst |
| 5,496,097 A | 3/1996 | Eckert |
| | (Continued) | |

FOREIGN PATENT DOCUMENTS

| | | |
|---|---|---|
| CN | 101909953 A | 12/2010 |
| EP | 0 602 353 | 6/1994 |
| | (Continued) | |

OTHER PUBLICATIONS

International Preliminary Report on Patentability dated Apr. 7, 2016 in corresponding International Patent Application No. PCT/JP2014/074205.

(Continued)

*Primary Examiner* — Mussa A Shaawat
*Assistant Examiner* — Abdhesh K Jha (57) ABSTRACT

Provided is a vehicle braking force controller that can realize both improvement of passengers' riding comfort and feeling, and quick responsiveness, and that is excellent in stability against noise. The vehicle braking force controller provides a braking force command value in response to a stroke amount of a brake pedal operated by a driver, to a braking device which provides braking force to wheels. A stroke amount detection unit which detects a stroke amount inputted to the brake pedal is provided. A path-corresponding braking force command value changing unit is provided which changes the relationship between the stroke amount and the braking force command value determined based on the stroke amount, in response to an increase-decrease path that the stroke amount inputted from the brake pedal is following.

4 Claims, 9 Drawing Sheets

(52) U.S. Cl.
CPC ......... B60T 13/662 (2013.01); *B60T 2220/04* (2013.01)

(56) References Cited

U.S. PATENT DOCUMENTS

| | | |
|---|---|---|
| 6,648,427 B1 | 11/2003 | Wuerth et al. |
| 6,718,845 B2 | 4/2004 | Menzies |
| 7,887,145 B2 | 2/2011 | Niino et al. |
| 9,022,488 B2 | 5/2015 | Beier et al. |
| 9,616,865 B2 | 4/2017 | Yasui et al. |
| 2003/0066375 A1 | 4/2003 | Menzies |
| 2007/0210642 A1 | 9/2007 | Niino et al. |
| 2011/0005874 A1 | 1/2011 | Beier et al. |
| 2015/0081186 A1 | 3/2015 | Yasui et al. |

FOREIGN PATENT DOCUMENTS

| | | |
|---|---|---|
| EP | 0 626 297 | 11/1994 |
| GB | 2 340 194 B | 2/2000 |
| JP | 6-219266 | 8/1994 |
| JP | 2001-239925 | 9/2001 |
| JP | 2003-216259 | 7/2003 |
| JP | 2006-281810 | 10/2006 |
| JP | 2006-281872 | 10/2006 |
| JP | 2007-230378 | 9/2007 |
| JP | 2009-29294 | 2/2009 |
| JP | 4449898 | 4/2010 |
| JP | 2010-264976 | 11/2010 |
| WO | WO 2013/099850 | 7/2013 |

OTHER PUBLICATIONS

International Search Report dated Dec. 9, 2014 in corresponding International Application PCT/JP2014/074205.
Chinese Office Action dated May 4, 2017 in corresponding Chinese Patent Application No. 201480052294.0.
Japanese Office Action dated May 16, 2017 in corresponding Japanese Patent Application No. 2013-196449.
Extended European Search report dated Mar. 27, 2017 in corresponding European Patent Application No. 14 848 772.1 in English.

(2) F' > U(S) AND F' < D(S)

Fig. 7 EXAMPLE OF HYSTERESIS

Fig. 8 MAPS ARE PARALLEL TO EACH OTHER AND INTERCEPT IS PROVIDED FOR BRAKING FORCE COMMAND VALUE

Fig. 9

MAPS COMPOSED OF CURVE AND/OR POLYGONAL LINE, AND PARTIALLY WITHOUT HYSTERESIS

VEHICLE BRAKING FORCE CONTROLLER

CROSS REFERENCE TO THE RELATED APPLICATION

This application is a continuation application, under 35 U.S.C. § 111(a), of international application No. PCT/JP2014/074205, filed Sep. 12, 2014, which claims priority to Japanese patent application No. 2013-196449, filed Sep. 24, 2013, the disclosure of which are incorporated by reference in their entirety into this application.

BACKGROUND OF THE INVENTION

Field of the Invention

The present invention relates to vehicle braking force controllers. For example, the present invention relates to a vehicle braking force controller that uses an electric brake not having mechanical connection between a brake member and a brake pedal, and/or regenerative braking not using braking force based on friction.

Description of Related Art

1. In the case of conventional-type hydraulic brake

A master cylinder is pressed in response to the stroke amount of a brake pedal, i.e. the pedal pressing amount, to increase the hydraulic pressure in the piping, whereby a brake member generates pressing force. When the brake pedal is released, hysteresis is generated mainly due to fluid resistance in pipelines and friction force of the master cylinder. Also in the case where the brake pedal is further pressed after a certain stroke amount has been made and then the brake pedal is retuned, unless the brake pedal is returned by a greater amount, the resultant pressing force does not coincide with the pressing force realized before the brake pedal has been further pressed.

In moderate braking operation as performed during speed adjustment and cruising traveling in towns, minute fluctuation in the stroke amount is offset due to the presence of the hysteresis. Accordingly, unnecessary fluctuation in the vehicle behavior is suppressed, and as a result, passengers' riding comfort is realized. When the brake pedal is released, braking force will remain by the amount corresponding to the hysteresis, and thus, return from the nose dive caused by the braking becomes moderate, and thus, fluctuation in the vehicle attitude becomes moderate. This also contributes to passengers' riding comfort.

2. In the case of a brake device not having mechanical connection between the brake member and the brake pedal 2-1. A technology has been proposed in which after an operation amount of the brake pedal is obtained, hysteresis is realized through signal processing that uses a change rate map (Patent Document 1). This technology uses a map in which the change rate is greater on the releasing-side than on the pressing-side.

2-2. A technology has been proposed in which: based on a pressing force applied on the brake pedal, the state of operation, i.e., whether the operation is a pressing operation, a releasing operation, or a retaining operation, is determined; and hysteresis is provided between a command value for the pressing force in the pressing operation and a command value for the pressing force in the releasing operation (Patent Document 2).

2-3. Technologies have been proposed in which, a member or a mechanism that generates hysteresis is interposed in a reaction force generation mechanism for a brake pedal (Patent Documents 3, 4, and 5). These technologies have been proposed in order to make the feeling of pressing the brake pedal close to that realized with a conventional brake that uses hydraulic pressure.

RELATED DOCUMENT

Patent Document

[Patent Document 1] JP Laid-Open Patent Publication No. 2010-264976
[Patent Document 2] JP Laid-Open Patent Publication No. 2006-281810
[Patent Document 3] JP Laid-Open Patent Publication No. 2001-239925
[Patent Document 4] JP Laid-Open Patent Publication No. 2003-216259
[Patent Document 5] JP Patent No. 4449898

SUMMARY OF THE INVENTION

In a vehicle according to 2. above which is provided with: an electric brake not having mechanical connection between the brake member and the brake pedal; and regenerative braking realized through a driving motor not using braking force based on friction, the following can be realized. That is, based on a braking force command value generated by a stroke sensor which detects the pressing amount of the brake pedal, the electric brake can convert the braking force command value into a press command to be applied to the brake member, for thereby causing the actual pressing realized by the brake member to quickly and accurately follow the pressing, and the regenerative braking can convert the braking force command value into a braking torque, for thereby causing the actual braking torque realized through torque control to quickly and accurately follow the pressing.

However, with respect to the electric brake, in any of the cases where the relationship between the pedal stroke and the braking force command value is determined according to a straight line, a curve, and a straight line having a break point, braking responds too sensitively compared with that in a conventional-type hydraulic brake, which may lead to uncomfortable feeling for the driver. In order to solve this problem, a method is used in which the pedal stroke amount and the braking force command value are passed through a lowpass filter, thereby making the signal less sharp.

By using a lowpass filter for the detected pedal stroke amount, even when unexpected stroke amount change is caused by vibration from the road surface or stroke amount behavior is caused by rough pedal operation, it is possible to suppress fluctuation in the braking force command value. However, on a harsh braking or steep releasing, it is predicted that the braking force command value does not follow such operation, and quick responsiveness, which is an advantage of the electric brake, may be lost.

In the technology according to 2-1. above, where hysteresis is realized through signal processing after the operation amount of the brake pedal has been obtained, if the stroke amount is slightly reduced from a certain stroke amount, the press command value greatly decreases toward the decrease-side map, and then the press command value decreases in response to the decrease-side map. If the brake pedal is pressed again before the decrease-side map is reached, the press command value increases from that command value by the same change amount as on the pressing-side map. With this technology, suppression of command value fluctuation due to stroke amount fluctuation, the suppression being targeted by the present invention, cannot be achieved.

In the technology according to 2-2. above, where hysteresis is provided between the command value for the pressing force and the command value for the pressing force in a releasing operation, the pressing force is used as an input. Thus, introducing this technology into a vehicle is not easy in terms of costs and stability against noise. When introducing such technology into a vehicle, taking into consideration the fact that many conventional-type vehicles have overcome the problems of costs, stability against noise, and stroke detection, it is easier to use the stroke as an input than to use the pressing force as an input.

In the technology according to 2-3. above, where a member or a mechanism that generates hysteresis is interposed in a reaction force generation mechanism for the brake pedal, if stroke fluctuation is caused due to vibration from the road surface, fluctuation in the braking force command value and the resultant fluctuation in the attitude cannot be reduced, unlike in the case of the conventional-type hydraulic brake.

An object of the present invention is to provide a vehicle braking force controller that can realize both improvement of passengers' riding comfort and feeling, and quick responsiveness, and that is excellent in stability against noise.

Hereinafter, for the sake of convenience in facilitating understanding of the present invention, description will be given with reference to the reference numerals used in embodiments.

A vehicle braking force controller according to the present invention is a vehicle braking force controller for providing a braking force command value in response to a stroke amount of braking force input unit 2 configured to be operated by a driver, to a braking device 1 for providing braking force to wheels, the vehicle braking force controller including:

a stroke amount detection unit 5 configured to detect a stroke amount inputted to the braking force input unit 2; and a path-corresponding braking force command value changing unit 6 configured to change relationship between the stroke amount and the braking force command value determined based on the stroke amount, in response to an increase-decrease path that the stroke amount detected by the stroke amount detection unit 5 is following.

According to this configuration, when the driver operates the braking force input unit 2, the stroke amount detection unit 5 detects the stroke amount inputted to the braking force input unit 2. The path-corresponding braking force command value changing unit 6 changes relationship between the stroke amount and the braking force command value determined based on the stroke amount, in response to increase-decrease path that the stroke amount detected by the stroke amount detection unit 5, i.e., the inputted stroke amount, follows. The path-corresponding braking force command value changing unit 6 changes the relationship between the stroke amount and the braking force command value such that, for example, when the braking force input unit 2 is further pressed after a certain stroke amount has been made and then the braking force input unit 2 is returned, unless the braking force input unit 2 is returned by a greater amount, the braking force command value does not become the same as that before the braking force input unit 2 has been further pressed.

By changing the relationship between the stroke amount and the braking force command value depending on the increase-decrease path that the stroke amount follows, it is possible to reduce variation and fluctuation in the braking force command value, without causing lag in relationship between the braking force command value and the stroke amount on the pressing-side and the releasing-side, even when there are fluctuation in the stroke amount caused by rough operation performed on the braking force input unit 2, and unexpected stroke amount change caused by receiving vibration from the road surface. Accordingly, it is possible to realize both of improvement of passengers' riding comfort and feeling, and quick responsiveness. Since the present invention uses the stroke amount as an input, the present invention is excellent in stability against noise and cost performance compared with the conventional technology where hysteresis is provided between the vehicle output command for the pressing force and the vehicle output command for the pressing force in a releasing operation, and thus, the present invention can be easily introduced into a braking force controller.

The path-corresponding braking force command value changing unit 6 may include a hysteresis generation section 7 configured to generate hysteresis such that the braking force command value corresponding to the stroke amount becomes smaller when the stroke amount increases, compared to when the stroke amount decreases. Accordingly, the hysteresis generation section 7 generates hysteresis in the relationship between the stroke amount and the braking force command value, and thus, it is possible to realize passengers' riding comfort as realized with the hydraulic brake, and at the same time, it is possible to realize quick responsiveness to commands issued at the time of quick pressing and quick release of the braking force input unit 2.

The hysteresis generation section 7 may include:

a braking force command storage section 10 configured to store a history of the braking force command value;

a pressing-side map 11 which uniquely determines a braking force command value based on a current stroke amount when the stroke amount is increasing;

a releasing-side map 12 which uniquely determines a braking force command value based on a current stroke amount when the stroke amount is decreasing; and a braking force command selection section 13 configured to select, based on a predetermined condition, any one of an immediately preceding braking force command value relative to a braking force command value currently outputted from the braking force command storage section 10, a pressing-side map output outputted from the pressing-side map 11, and a releasing-side map output outputted from the releasing-side map 12.

According to this configuration, a pressing-side map output and a releasing-side map output corresponding to the current stroke amount are respectively calculated, and are inputted to the braking force command selection section 13. The braking force command selection section 13 receives a braking force command value F' in an immediately preceding calculation time period from the braking force command storage section 10. Then, the braking force command selection section 13 selects, based on a predetermined condition, any one of the braking force command value F', a pressing-side map output $U(S)$, and a releasing-side map output $D(S)$, and outputs the selected value as a braking force command value F. The predetermined condition is as follows, for example.

(1) When $F' \leq U(S)$, output is made as $F = U(S)$.
(2) When $F' > U(S)$ and $F' < D(S)$, $F = F'$ is set, and the braking force command value is maintained.
(3) When $F' \geq D(S)$, output is made as $F = D(S)$.

In this case, when the braking force input unit 2 is further pressed after a certain stroke amount has been made and then the braking force input unit 2 is released, until the relationship between the stroke amount and the braking force command value coincides with the condition of the releasing-side map 12, the braking force command value is maintained. After the stroke amount and the braking force command value coincides with the condition of the releasing-side map 12, the braking force command value is decreased in response to the releasing-side map 12. Accordingly, the stroke occurring between the pressing-side map 11 and the releasing-side map 12 serves as an invalid stroke, for which the braking force command value does not change even if the stroke amount has changed, and a relationship is established between the pressing and the releasing in which different paths are respectively taken and hysteresis is provided.

The braking force command value may be used as a pressing command value against a brake pad in the braking device 1.

The hysteresis generation section 7A may include a plurality of the pressing-side maps 11 and a plurality of the releasing-side maps 12, a map selection unit 14 configured to select, based on switching operation performed by a driver or based on a vehicle operation history, a defined pressing-side map 11 and a defined releasing-side map 12 from a plurality of combinations of the pressing-side maps 11 and the releasing-side maps 12.

For example, the map selection unit 14 selects a defined pressing-side map 11 and a defined releasing-side map 12, such that the hysteresis width is widen in a region where delicate operation is difficult to be made because of the driver's operational characteristics, or in a region that is often used when moderate speed reduction is performed in a vehicle where riding comfort is important. Further, for example, the map selection unit 14 selects a defined pressing-side map 11 and a defined releasing-side map 12, such that the hysteresis width is narrowed in a region where delicate operation is effectively performed because of the driver's operational characteristics, or in a vehicle or a mode whose characteristic feature is sports drive or high responsiveness.

The map selection unit 14 may select a defined pressing-side map 11 and a defined releasing-side map 12, when, as the vehicle operation history, a speed of operating the braking force input unit 2 is greater than a predetermined threshold value, or when, as the vehicle operation history, releasing operation that decreases the stroke amount has been repeated a specified number of times or more. By selecting a defined pressing-side map 11 and a defined releasing-side map 12 while using the pressing speed or the number of times of releasing operations as an index in this manner, it is possible to easily obtain responsiveness, and riding comfort and feeling that suit the driver's preference.

The path-corresponding braking force command value changing unit 6 may cancel generation of the hysteresis in the hysteresis generation section 7, in response to operation performed by the driver or in response to determination by a hysteresis cancellation unit provided in a control unit mounted in the vehicle. The path-corresponding braking force command value changing unit 6 may cancel generation of the hysteresis in the hysteresis generation section 7, when, as the operation performed by the driver, a speed of operating the braking force input unit 2 is greater than a predetermined threshold value, or when, as the operation performed by the driver, releasing operation that decreases the stroke amount has been repeated a specified number of times or more.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
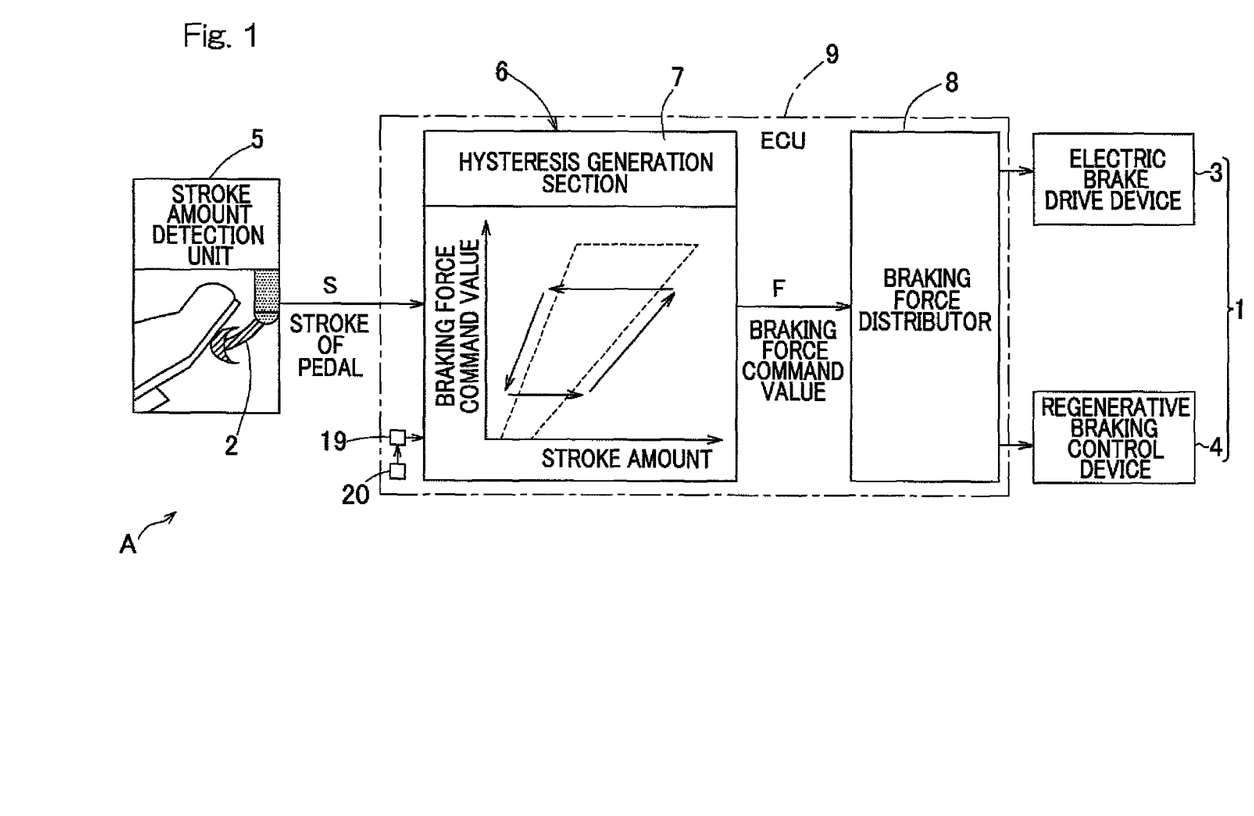
FIG. 1 is a schematic block diagram showing a vehicle braking force controller according to a first embodiment of the present invention.

A vehicle braking force controller according to a first embodiment of the present invention will be described with reference to FIG. 1 to FIG. 7. The following description also includes description of a vehicle braking force control method. FIG. 1 is a schematic block diagram showing the entire configuration of the vehicle braking force controller. The braking force controller A may be mounted, for example, in a vehicle such as an electric vehicle. The braking force controller A provides a braking device 1 which provides a braking force to each wheel (drive wheel 16 and/or driven wheel 17 shown in FIG. 11) of the vehicle, with a braking force command value F in response to a stroke amount of a brake pedal 2 which is braking force input unit operated by a driver. In this example, the braking device 1 includes an electric brake drive device 3 and a regenerative braking control device 4.

The electric brake drive device 3 is a device that does not have mechanical connection between the brake member and the brake pedal. In the electric brake drive device 3, when the brake pedal 2 is pressed by the driver, rotary motion of a motor (not shown) is, for example, converted into linear motion through a linear motion mechanism, and a brake pad is pressed to be in contact with a brake disc, for thereby applying a braking force based on friction. The regenerative braking control device 4 is a device that uses regenerative braking without using braking force based on friction. When the brake pedal 2 is pressed, the regenerative braking control device 4 causes a drive motor for traveling (not shown), for example, to generate a negative torque, for thereby applying a braking force.

The braking force controller A includes a stroke amount detection unit 5 and a path-corresponding braking force command value changing unit 6. The stroke amount detection unit 5 is a sensor that detects the stroke amount of the brake pedal 2. The path-corresponding braking force command value changing unit 6 changes the relationship between the stroke amount and the braking force command value determined from this stroke amount, in response to the increase-decrease path that the stroke amount inputted from the brake pedal 2 is following. The path-corresponding braking force command value changing unit 6 includes a hysteresis generation section 7.

The hysteresis generation section 7 generates hysteresis such that the braking force command value corresponding to the stroke amount from the stroke amount detection unit 5 becomes smaller when the stroke amount is increasing, compared to when the stroke amount is decreasing. The hysteresis generation section 7 performs calculation based on a logic described later, to generate hysteresis between the stroke amount of the pedal and the braking force command value, and then provides a braking force distributor 8 with a braking force command value for a braking force that is to be applied to the vehicle. In the case where braking forces generated according to different principles, e.g., a braking force based on friction and a braking force based on electric reaction force, are used in combination, such usage being represented by regenerative cooperation control, the braking force distributor 8 is an element that determines, the respective braking forces to be distributed to the respective mechanisms.

The braking force command value provided to the braking force distributor 8 is suitably distributed to the mechanisms that generate the respective braking forces, i.e., the electric brake drive device 3 and the regenerative braking control device 4. The electric brake drive device 3 and the regenerative braking control device 4 generate respective braking forces in response to the respective distributed values, whereby the vehicle on the whole exhibits a braking force based on the braking force command value.

The hysteresis generation section 7 and the braking force distributor 8 are provided in, for example, an ECU 9. The ECU 9 is a host control unit which performs comprehensive control on the entire vehicle, for example. The ECU 9 may include a computer, programs executed by the computer, various types of electronic circuits, and the like. In the case where only a single type of braking according to a single principle is used, as in the case where the braking device 1 is composed of, for example, the electric brake drive device 3 alone, the braking force distributor 8 is not necessary.

Figure 2:
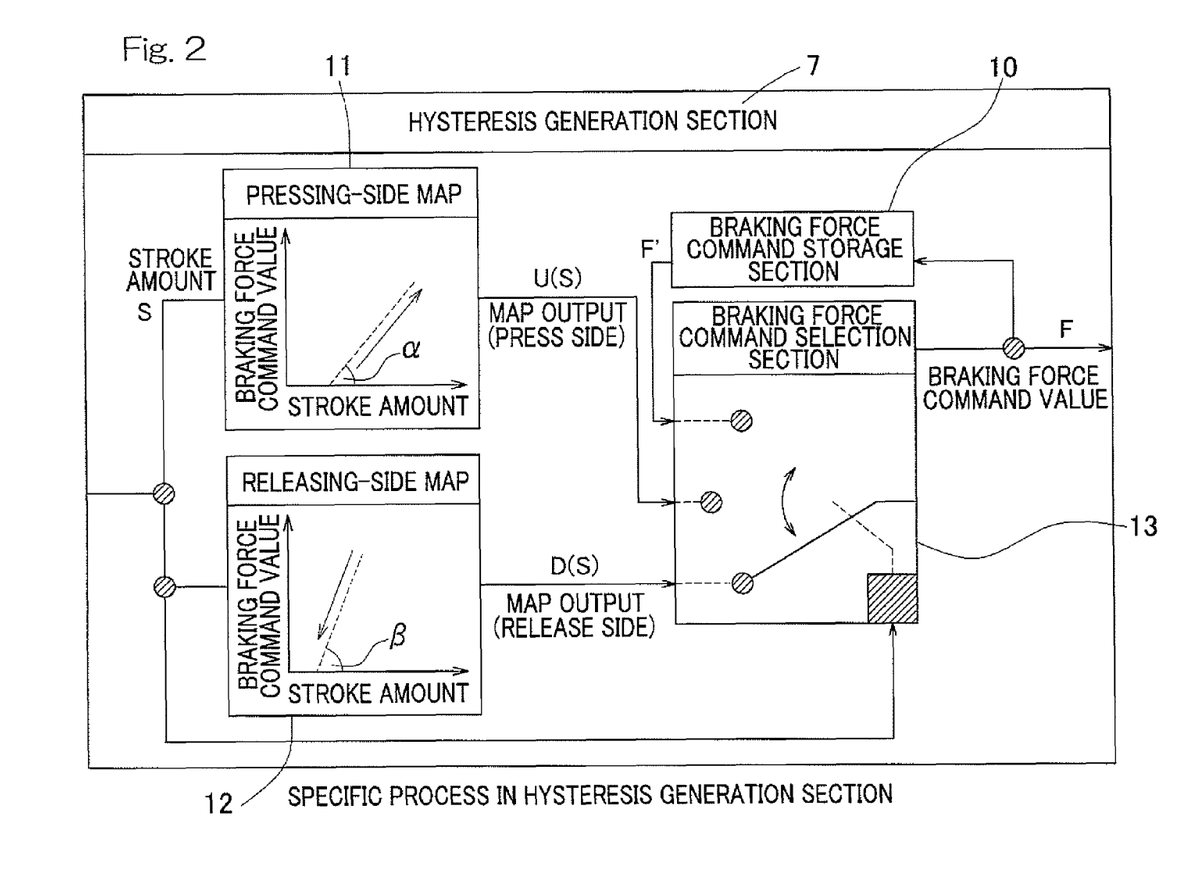
FIG. 2 is a block diagram showing the inside of a hysteresis generation section of the braking force controller.

FIG. 2 is a block diagram showing a specific process performed in the hysteresis generation section 7. The hysteresis generation section 7 can be realized by, for example, software for a digital computing unit represented by a microcomputer. The hysteresis generation section 7 includes a braking force command storage section 10, a pressing-side map 11, a releasing-side map 12, and a braking force command selection section 13. The braking force command storage section 10 has stored therein history of the braking force command value in an immediately preceding calculation time period relative to the calculation time period for the braking force command value currently outputted. The braking force command value is rewritably stored in the braking force command storage section 10.

In each of the pressing-side map 11 and the releasing-side map 12, if the stroke amount of the brake pedal is determined, a braking force command value is uniquely determined. Each of the pressing-side map 11 and the releasing-side map 12 is expressed as a straight line that does not have an intercept on the vertical axis (braking force command value axis) for the braking force command value. Each of the pressing-side map 11 and the releasing-side map 12 has an intercept on the horizontal axis (stroke amount axis). The intercept on the horizontal axis allows providing of a "dead zone" described later. The slope $\alpha$, of the straight line in the pressing-side map 11, which represents the braking force command value relative to the stroke amount is set to be smaller than the slope $\beta$, of the straight line in the releasing-side map 12, which represents the braking force command value relative to the stroke amount.

With respect to each of the pressing-side map 11 and the releasing-side map 12, a map output when the current stroke amount is S (the pressing-side map output is expressed as U(S), and the releasing-side map output is expressed as D(S)) is calculated, and the calculated map output is inputted to the braking force command selection section 13. The braking force command selection section 13 receives a braking force command value F' in an immediately preceding calculation time period from the braking force command storage section 10, compares the braking force command value F' with the two map outputs U(S) and D(S), and selects any one of the braking force command value F', the pressing-side map output U(S), and the releasing-side map output D(S), based on the predetermined conditions described below.

A method for the comparison and a command value to be outputted based on the result of the comparison may be based on the three conditions (1) to (3) below. Each of the cases will be described with reference to FIGS. 3 to 5. The stroke amount of the brake pedal in the immediately preceding calculation time period is represented by S', and the braking force command value at that time is represented by F'. A method for determining a braking force command value F when the stroke amount of the brake pedal has changed from the stroke amount S' to the current stroke amount S will be described. It should be noted that there is no continuation of states among the three figures of FIG. 3, FIG. 4, and FIG. 5.

Figure 3:
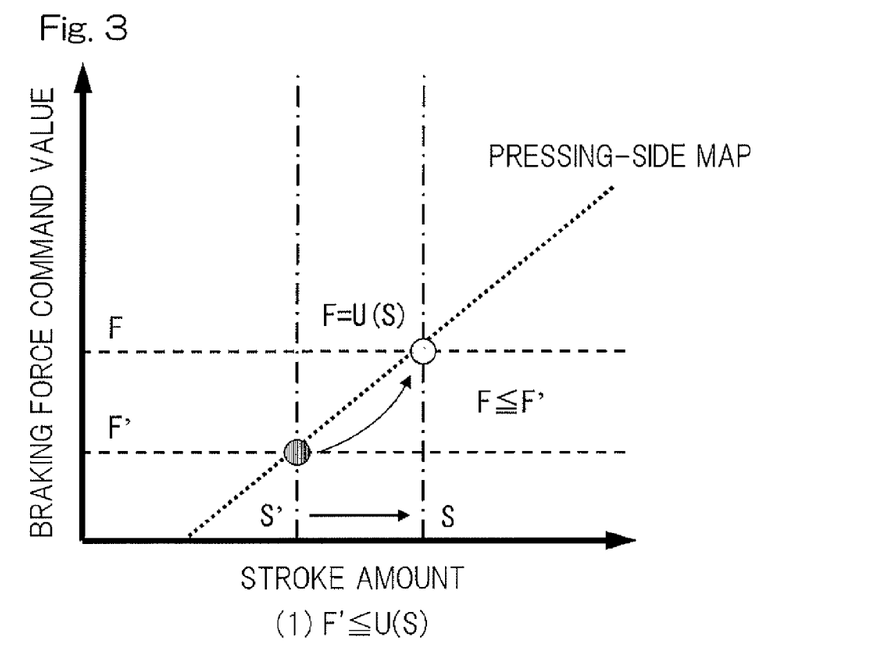
FIG. 3 shows an example in which a braking force command selection section of the hysteresis generation section has selected a pressing-side map output.

(1) When F'$\leq$U(S): output is made as F=U(S).

As shown in FIG. 3, it is assumed that the stroke amount of the brake pedal has increased from S' to S. When the pressing-side map output U(S) at the stroke amount S and the braking force command value F' at the stroke amount S' are compared with each other, the condition of F'$\leq$U(S) is satisfied, and thus, the braking force command value F is outputted as F=U(S).

Figure 4:
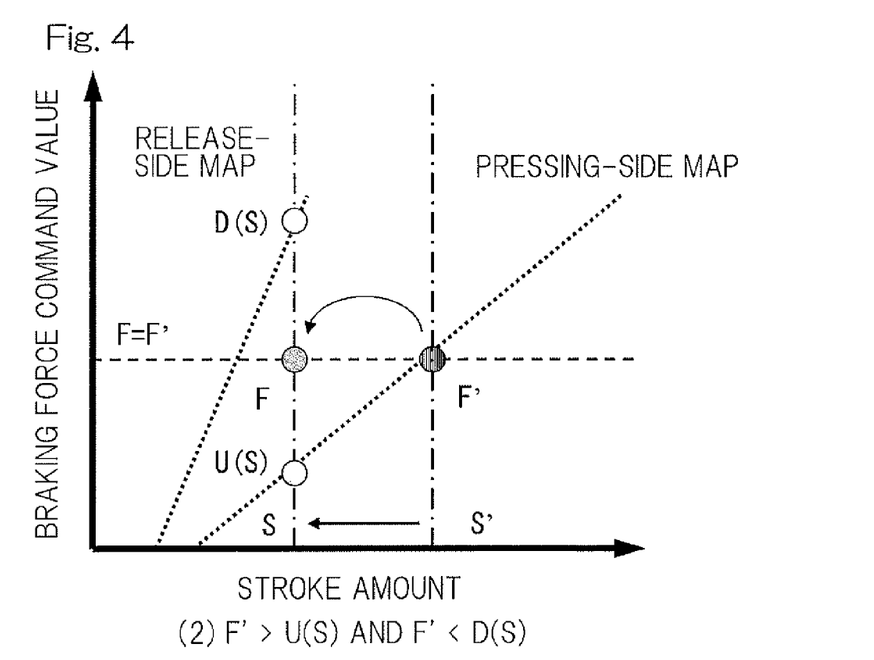
FIG. 4 shows an example in which the braking force command selection section has selected an immediately preceding braking force command value.

(2) When F'>U(S) and F'<D(S): F=F' is set, i.e., the braking force command value is maintained to be the immediately preceding braking force command value F'.

As shown in FIG. 4, it is assumed that the stroke amount of the brake pedal has decreased from S' to S. When the map outputs U(S) and D(S) at the stroke amount S are compared with the braking force command value F', the braking force command value F' is between the pressing-side map output U(S) and the releasing-side map output D(S). That is, the condition of F'>U(S) and F'<D(S) is satisfied. In this case, the braking force command value F is outputted as F=F'.

Figure 5:
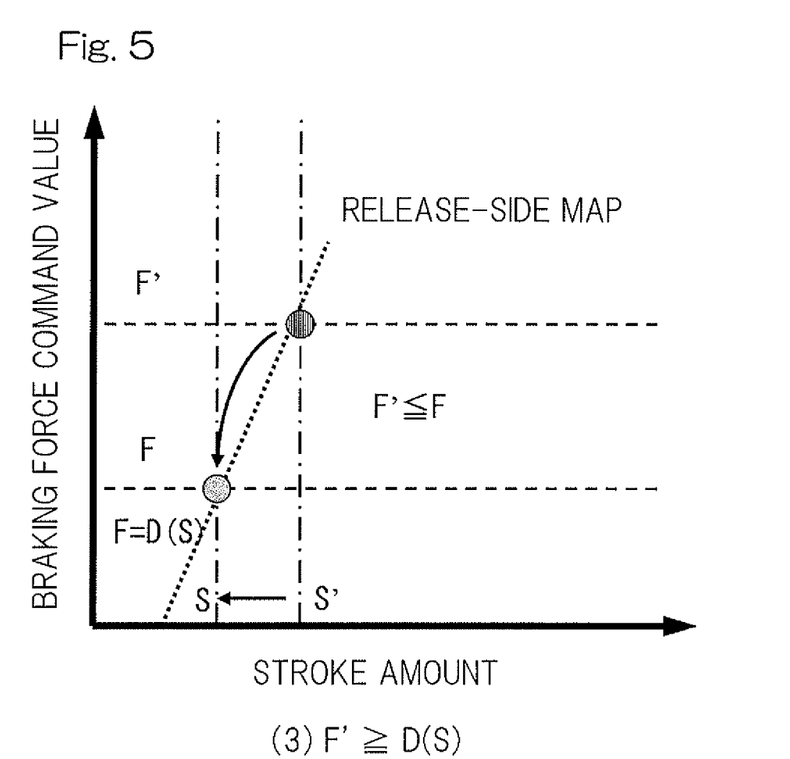
FIG. 5 shows an example in which the braking force command selection section has selected a releasing-side map output.

(3) When F'≥D(S): output is made as F=D(S).

As shown in FIG. 5, it is assumed that the stroke amount of the brake pedal has decreased from S' to S. When the releasing-side map output D(S) at the stroke amount S and the braking force command value F' are compared with each other, the condition of F'≥D(S) is satisfied. In this case, the braking force command value F is outputted as F=D(S). In FIG. 5, the operation point starts at the point where F'=D(S') is satisfied and shifts to the point where F=D(S) is satisfied. However, the start point is not limited to such a point on the releasing-side map output D(S) as long as the start point is located on the right side of the releasing-side map.

Figure 6:
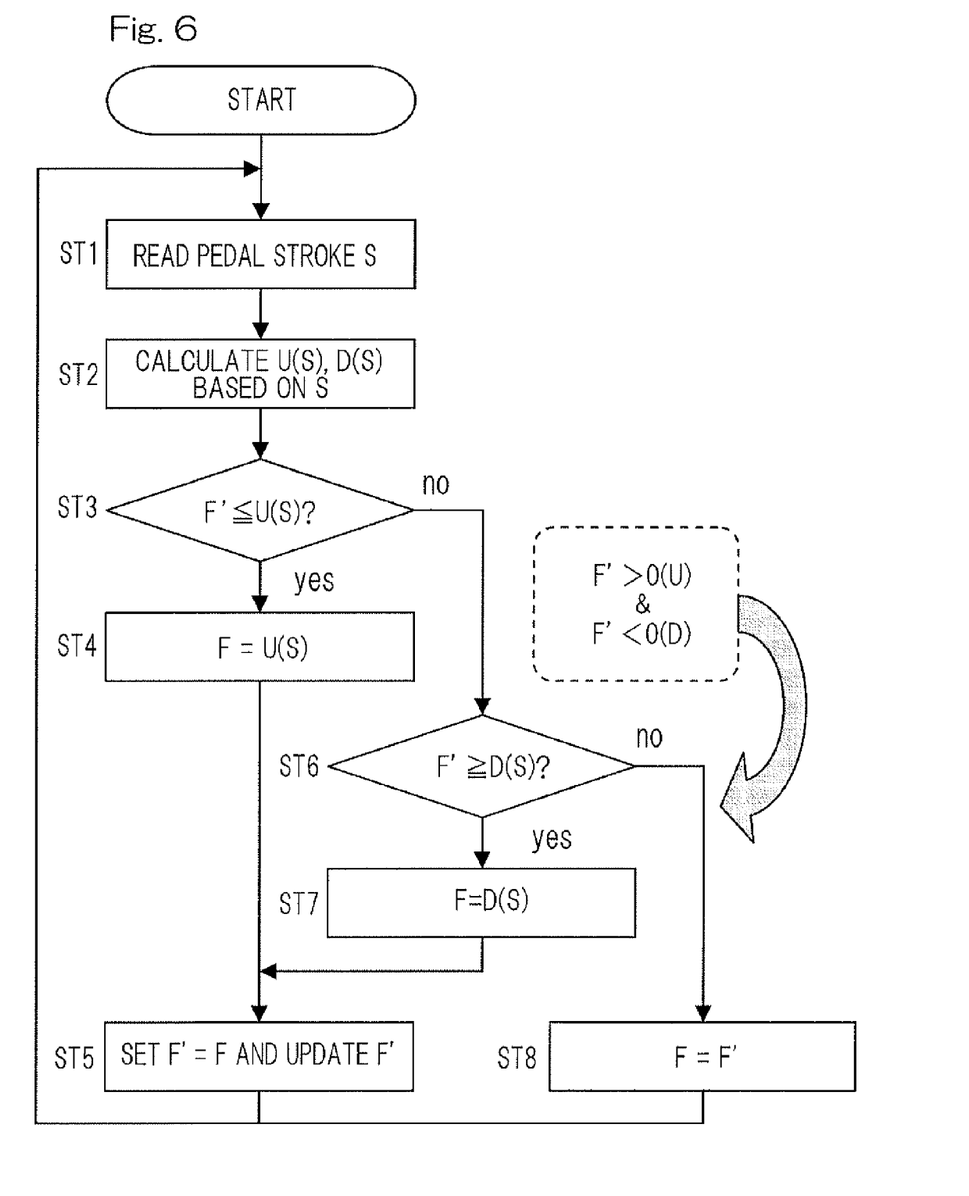
FIG. 6 is a flowchart showing a calculation flow performed by the hysteresis generation section.

For performing comparison among the three conditions, an example of a calculation flow which may be actually performed will be described with reference to FIG. 6. The description will be made also with reference to FIG. 2. After this process is started (START), first, the hysteresis generation section 7 reads the current stroke amount S of the brake pedal from the stroke amount detection unit 5 (ST1). Based on the read stroke amount S, the hysteresis generation section 7 calculates the pressing-side map output U(S) and the releasing-side map output D(S) at the stroke amount S (ST2). Next, the braking force command selection section 13 of the hysteresis generation section 7 reads an immediately preceding braking force command value F' from the braking force command storage section 10, and compares the braking force command value F' with the pressing-side map output U(S) (ST3). It should be noted that the initial value of the braking force command value F' is zero.

At this time, if F'≤U(S) is true (ST3: yes), F=U(S) is set (ST4), and further, F'=F is set, and the braking force command value F' in the braking force command storage section 10 is updated (ST5). Then, the process returns to ST1. If it is determined that F'≤U(S) is false in ST3 (ST3: no), the braking force command selection section 13 compares the immediately preceding braking force command value F' with the releasing-side map output D(S) (ST6). At this time, if F'≥D(S) is true (ST6: yes), F=D(S) is set (ST7), and the process shifts to ST5 to update the braking force command value F' in the braking force command storage section 10, and then returns to ST1. If it is determined that F'≥D(S) is false in ST6 (ST6: no), the condition of F'>U(S) and F'<D(S) is satisfied. Thus, the braking force command value F is outputted as F=F'. That is, the output of the braking force command value F is maintained to be the same as the immediately preceding value (ST8). Then, the process returns to ST1. In this case the braking force command value F' is not updated.

Figure 7:
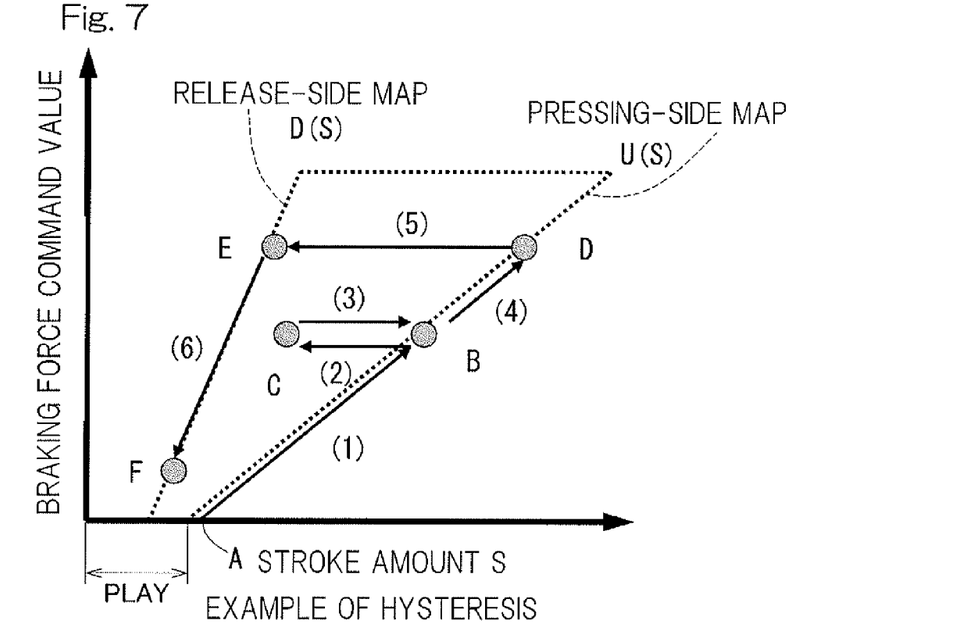
FIG. 7 is a diagram explaining operation of causing the hysteresis generation section to generate hysteresis.

An example of a series of operations performed when hysteresis is generated based on the above calculation rule will be specifically described with reference to FIG. 7. The braking force controller A is intended to improve passengers' riding comfort and feeling in the state where the brake pedal is being pressed, and as already described, adds an invalid stroke which prevents change in the braking force command value F even when the stroke amount S has changed. When maps are set, in order to add an invalid stroke, a dead zone may be provided where the pressing starts (near a position where the stroke amount is zero). The dead zone is provided not only for adding the invalid stroke, but also for providing the effect of "play" which prevents generation of a braking force command value even when a slight pressing of the brake pedal is unintentionally made while pressing thereof is ready with a foot on the brake pedal. The region from zero to a point A in the stroke amount shown in FIG. 7 corresponds to the "play".

(1) In the case where the stroke amount S has reached the point A on the pressing-side map, the condition of F'≤U(S) is satisfied, thus, the braking force command value F=U(S) is set, and then the stroke amount S has further increased, the braking force command value is increased in response to the pressing-side map. The braking force command value F' is updated each time such an increase is made.

(2) It is assumed that, when a point B on the pressing-side map has been reached, pressing of the brake pedal is loosened and the stroke amount is decreased. At this time, if a point C is reached with F'>U(S) and F'<D(S) satisfied, the braking force command value F=F' is set, and the braking force command value is maintained. The point C is between the pressing-side map and the releasing-side map, and is present within the invalid stroke range.

(3) Even if the brake pedal is further pressed again from the point C to increase the stroke amount S, F'>U(S) and F'<D(S) are still satisfied until the point B is reached, and thus, the braking force command value is maintained.

(4) After the point B is reached, as in the case of the path taken in (1), the condition of F'≤U(S) is satisfied, and thus, the braking force command value F=U(S) is set in response to the pressing-side map.

(5) After a point D on the pressing-side map is reached, even if the stroke amount is decreased, the braking force command value is maintained as in the case of the path taken in (2) above. Then, if the stroke amount is further decreased, a point E on the releasing-side map is reached.

(6) When the point E is reached, the condition of F'≥D(S) is satisfied, and thus, F=D(S) is set. Then, if the stroke amount S is further decreased, the braking force command value is decreased in response to the releasing-side map.

According to the vehicle braking force controller A described above, by changing the relationship between the stroke amount and the braking force command value depending on the increase-decrease path that the stroke amount follows, it is possible to reduce variation and fluctuation in the braking force command value, without causing lag in relationship between the braking force command value and the stroke amount on the pressing-side and the releasing-side, even when there are fluctuation in the stroke amount caused by rough operation performed on the brake pedal 2, and unexpected stroke amount change caused by vibration from the road surface. Accordingly, it is possible to improve passengers' riding comfort and feeling. Since the stroke amount is used as an input, the present technology is excellent in stability against noise and cost performance compared with the conventional technology where hysteresis is provided between the vehicle output command for the pressing force and the vehicle output command for the pressing force in a releasing operation, and thus, the present technology can be easily introduced into a braking force controller.

Since the hysteresis generation section 7 generates hysteresis in the relationship between the stroke amount and the braking force command value, it is possible to realize passengers' riding comfort as realized with the hydraulic brake, and at the same time, it is possible to realize quick responsiveness to commands issued at the time of quick pressing and quick release of the brake pedal 2. In the case where the brake pedal 2 is further pressed after a certain stroke amount has been made and then the brake pedal 2 is released, until the relationship between the stroke amount and the braking force command value coincides with the condition of the releasing-side map 12, the braking force command value is maintained. After the relationship between the stroke amount and the braking force command value coincides with the condition of the releasing-side map 12, the braking force command value is decreased in response to the releasing-side map 12. Accordingly, the stoke occurring between the pressing-side map 11 and the releasing-side map 12 serves as an invalid stroke, and a relationship is established between the pressing and the releasing in which different paths are respectively taken and hysteresis is provided.

Other embodiments will be described. In the following description, portions corresponding to the matters described in the preceding embodiment are denoted by like reference numerals, and repeated description is not given. When only a part of a configuration is described, the other part of the configuration is the same as described in the preceding description unless otherwise specified. The same operation and effect can be obtained from the same configuration. A combination of parts that are specifically described in the embodiments can be implemented, and further, the embodiments may be partially combined unless such combinations cause any problem.

Figure 8:
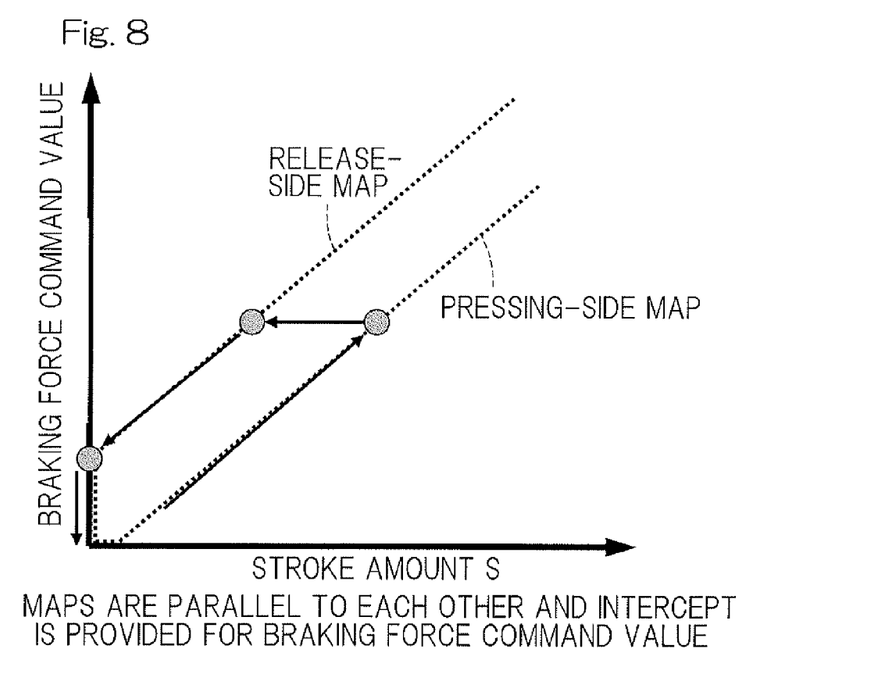
FIG. 8 shows a pressing-side map and a releasing-side map in a vehicle braking force controller according to another embodiment of the present invention.

In the above embodiment, the pressing-side map and the releasing-side map are respectively expressed as straight lines that have different slopes and that each do not have an intercept on the braking force command value axis thereof. However, the pressing-side map and the releasing-side map are not limited to such maps. For example, one or both of the pressing-side map and the releasing-side map may have an intercept for the braking force command value thereof. In such a case where an intercept is provided for the braking force command value, a relationship is realized where once the braking force command value rises, braking force will remain until the stroke amount becomes completely zero. As shown in FIG. 8, the straight line of the pressing-side map is made parallel to the straight line of the releasing-side map, and the releasing-side map may have an intercept on the braking force command axis.

Figure 9:
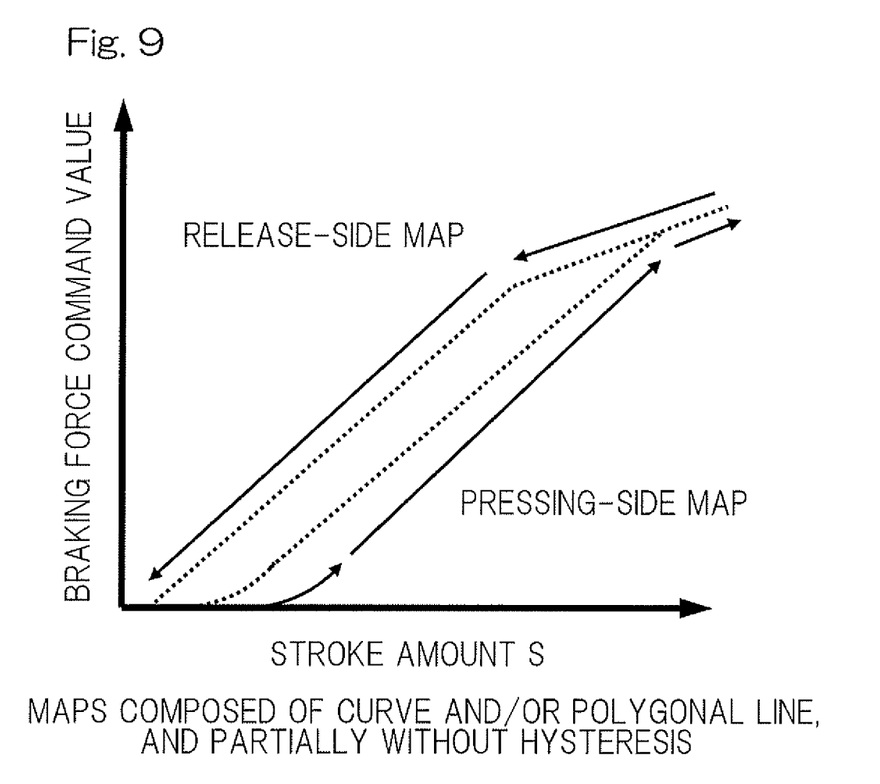
FIG. 9 shows a pressing-side map and a releasing-side map in a vehicle braking force controller according to still another embodiment of the present invention.

Further, as shown in FIG. 9, the maps may not be in a simple linear relationship, but may be composed of a curve, a polygonal line, and a combination thereof. Additionally or alternatively, the two maps may be in a relationship in which hysteresis is not partially provided. These are useful when setting a moderate-response region for the stroke amount of the brake pedal, or instead, when setting a sensitive-response region for the stroke amount of the brake pedal, or when realizing an optimum adjustment of the hysteresis width.

Figure 10:
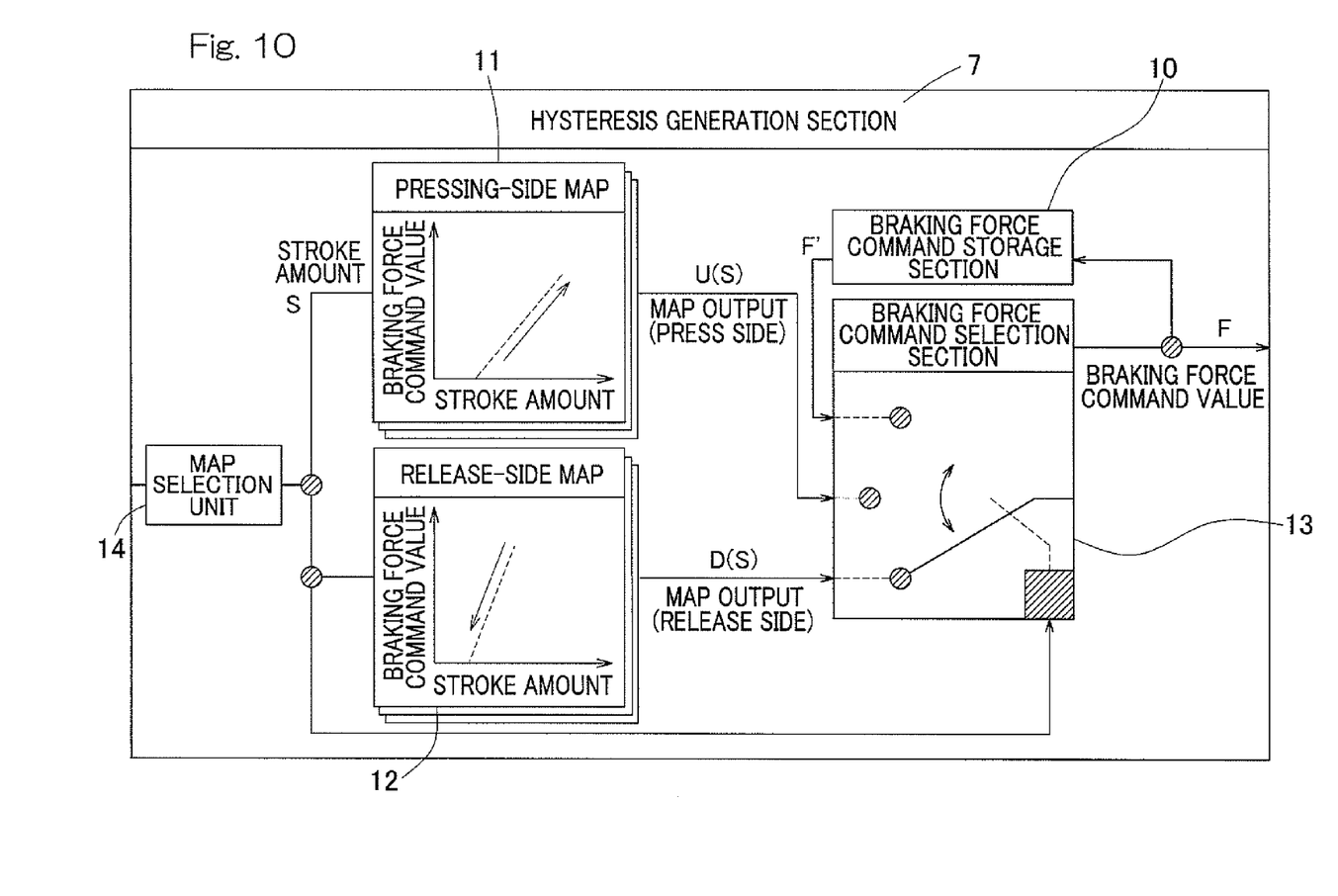
FIG. 10 is a block diagram showing the inside of a hysteresis generation section according to still another embodiment of the present invention.

In the case of a wide hysteresis width, compared with the case of a narrow hysteresis width, the braking force command value is not equivalently decreased unless a greater stroke amount is decreased. Accordingly, greater resistance against vibration is realized, which prevents change in the vehicle behavior even when rough pedal operation is performed. Thus, for example, as shown in FIG. 10, as still another embodiment, a plurality of the pressing-side maps 11 and a plurality of the releasing-side maps 12 may be provided, and a hysteresis generation section 7A may include a map selection unit 14 which selects, based on switching operation performed by the driver or based on vehicle operation history, a defined pressing-side map 11 and a defined releasing-side map 12 from among a plurality of combinations of the pressing-side maps 11 and the releasing-side maps 12. For example, the map selection unit 14 selects a defined pressing-side map 11 and a defined releasing-side map 12, such that the hysteresis width is widen in a region where delicate operation is difficult to be made because of the driver's operational characteristics, or in a region that is often used when moderate speed reduction is performed in a vehicle where riding comfort is important.

In contrast, in the case of a narrow hysteresis width, even a smaller pedal operation will allow easy decrease of the braking force command value, following the pedal operation. Thus, the braking force command value can follow minor operation amount change caused by the driver, or the time period for decreasing the stroke amount that corresponds to the hysteresis can be shortened. This provides an effect of improving the responsiveness to an input from the brake pedal as well. For example, the map selection unit 14 selects a defined pressing-side map 11 and a defined releasing-side map 12, such that the hysteresis width is narrowed in a region where delicate operation is effectively performed because of the driver's operational characteristics, in a vehicle whose characteristic feature is sports drive or high responsiveness, or in a mode of delicate operation, sports drive, or high responsiveness.

The map selection unit 14 may select a defined pressing-side map 11 and a defined releasing-side map 12, when, as the vehicle operation history, the speed of operating (performing input on) the brake pedal is greater than a predetermined threshold value, or when, as the vehicle operation history, releasing operation of decreasing the stroke amount has been repeated a specified number of times or more. The threshold value and the specified number of times are stored in a rewritable manner in a ROM of the ECU 9, for example. By selecting a defined pressing-side map 11 and a defined releasing-side map 12 while using the pressing speed or the number of times of releasing operations as an index in this manner, it is possible to easily obtain responsiveness, and riding comfort and feeling that suit the driver's preference.

The path-corresponding braking force command value changing unit 6 may cancel generation of hysteresis in the hysteresis generation section 7, in response to operation performed by the driver or in response to determination by hysteresis cancellation unit 19 (FIG. 1) which is provided in the ECU 9 being a control unit mounted in the vehicle. The hysteresis cancellation unit 19 may be provided in external control unit other than the ECU 9 which performs comprehensive control on the entire vehicle.

Meanwhile, the path-corresponding braking force command value changing unit 6 may cancel generation of the hysteresis in the hysteresis generation section 7, when, as the operation performed by the driver, the speed of performing input on the brake pedal 2 is greater than a predetermined threshold value, or when, as the operation performed by the driver, releasing operation of decreasing the stroke amount has been repeated a specified number of times or more. Further, a manual dedicated switch 20 (FIG. 1) for cancelling generation of hysteresis may be provided, and generation of hysteresis may be canceled by the driver or the like operating the dedicated switch 20.

Figure 11:
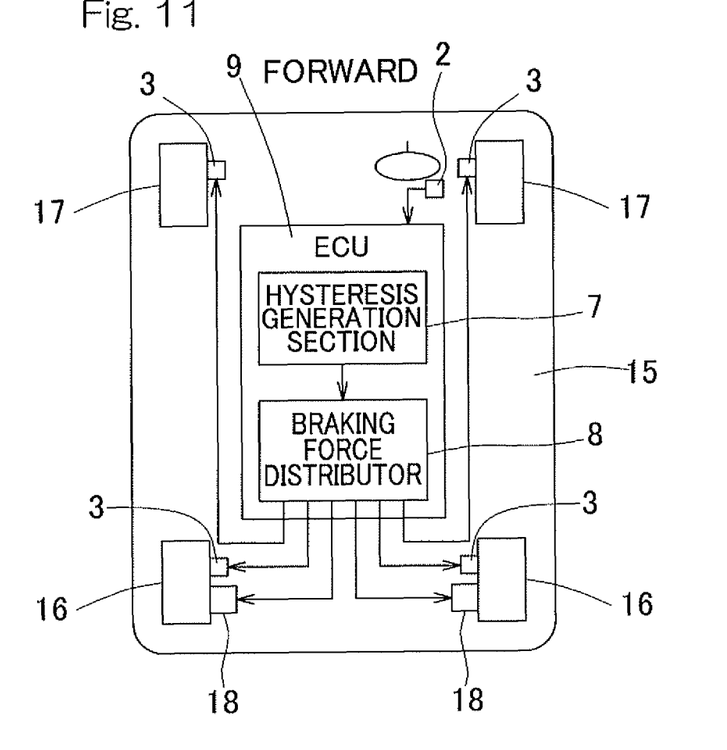
FIG. 11 is a schematic diagram of an electric vehicle in which any one of the braking force controllers according to the present invention is mounted therein.

FIG. 11 is a schematic diagram showing a four-wheeled electric vehicle having mounted therein the braking force controller according to any one of the embodiments above. This electric vehicle is a two-wheel-drive vehicle in which the left and right rear wheels 16 and 16 of a vehicle body 15 are drive wheels, and the left and right front wheels 17 and 17 are driven wheels. The left and right drive wheels are respectively provided with drive sources which independently provide drive forces. As each drive source, a motor 18 implemented by a synchronous motor or an induction motor is used, for example.

The left and right driven wheels and the left and right drive wheels are correspondingly provided with driven-wheel electric brake devices 3 and drive-wheel electric brake devices 3 which correspondingly provide the driven wheels and the drive wheels with braking forces, in response to operation performed on the brake pedal 2 by the driver. Based on the inputted stroke amount, the hysteresis generation section 7 provided in the ECU 9 distributes, via the braking force distributor 8, a braking force command value for a braking force to be exhibited by the vehicle, to the electric brake drive devices 3 and regenerative braking control devices (not shown) of the motors 18. Accordingly, a braking force based on the braking force command value is exhibited.

Even in the case where an internal combustion engine is used as a drive source, and the electric brake drive devices 3 alone are used without the regenerative braking control devices of the motors 18, the braking force controller of the present invention can be used. In such a case, the braking force distributor 8 is not necessary.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Braking device
2 . . . Brake pedal (braking force input unit)
5 . . . Stroke amount detection unit
6 . . . Path-corresponding braking force command value changing unit
7 . . . Hysteresis generation section
9 . . . ECU
10 . . . Braking force command storage section
11 . . . Pressing-side map
12 . . . Releasing-side map
13 . . . Braking force command selection section
14 . . . Map selection unit
19 . . . Hysteresis cancellation unit
A . . . Braking force controller

What is claimed is:

1. A vehicle braking force controller for providing a braking force command value in response to a stroke amount of a braking force input unit operated by a driver, to a braking device for providing braking force to wheels, the vehicle braking force controller comprising:
    a stroke amount detection unit configured to detect a stroke amount inputted to the braking force input unit; and
    a path-corresponding braking force command value changing unit configured to change a relationship between the stroke amount and the braking force command value determined based on the stroke amount, in response to an increase-decrease path that the stroke amount detected by the stroke amount detection unit is following,
    wherein the path-corresponding braking force command value changing unit includes a hysteresis generation section configured to generate hysteresis such that the braking force command value corresponding to the stroke amount becomes smaller when the stroke amount increases, compared to when the stroke amount decreases, and
    the hysteresis generation section includes
        a braking force command storage section configured to store a history of the braking force command value;
        a plurality of pressing-side maps that uniquely determine a braking force command value based on a current stroke amount when the stroke amount is increasing;
        a plurality of releasing-side maps that uniquely determine a braking force command value based on a current stroke amount when the stroke amount is decreasing;
        a map selection unit configured to select, based on switching operation performed by a driver or based on a vehicle operation history, a defined pressing-side map and a defined releasing-side map from among a plurality of combinations of the pressing-side maps and the releasing-side maps; and
        a braking force command selection section configured to select, based on a predetermined condition, any one of an immediately preceding braking force command value relative to a braking force command value currently outputted from the braking force command storage section, a pressing-side map output outputted from the defined pressing-side map, and a releasing-side map output outputted from the defined releasing-side map.

2. The vehicle braking force controller as claimed in claim 1, wherein the map selection unit selects the defined pressing-side map and the defined releasing-side map, when, as the vehicle operation history, a speed of operating the braking force input unit is greater than a predetermined threshold value, or when, as the vehicle operation history, releasing operation that decreases the stroke amount has been repeated a specified number of times or more.

3. A vehicle braking force controller for providing a braking force command value in response to a stroke amount of a braking force input unit operated by a driver, to a braking device for providing braking force to wheels, the vehicle braking force controller comprising:
    a stroke amount detection unit configured to detect a stroke amount inputted to the braking force input unit; and
    a path-corresponding braking force command value changing unit configured to change a relationship between the stroke amount and the braking force command value determined based on the stroke amount, in response to an increase-decrease path that the stroke amount detected by the stroke amount detection unit is following,
    wherein the path-corresponding braking force command value changing unit includes a hysteresis generation section configured to generate hysteresis such that the braking force command value corresponding to the stroke amount becomes smaller when the stroke amount increases, compared to when the stroke amount decreases, and
    the path-corresponding braking force command value changing unit cancels generation of the hysteresis in the hysteresis generation section, in response to an operation performed by the driver or in response to determination by a hysteresis cancelation unit provided in a control unit mounted in the vehicle.

4. The vehicle braking force controller as claimed in claim 3, wherein the path-corresponding braking force command value changing unit cancels generation of the hysteresis in the hysteresis generation section, when, as the operation performed by the driver, a speed of operating the braking force input unit is greater than a predetermined threshold value, or when, as the operation performed by the driver, releasing operation that decreases the stroke amount has been repeated a specified number of times or more.

* * * * *